(No Model.)
S. C. COBB.
CULTIVATOR.
No. 425,210.  Patented Apr. 8, 1890.
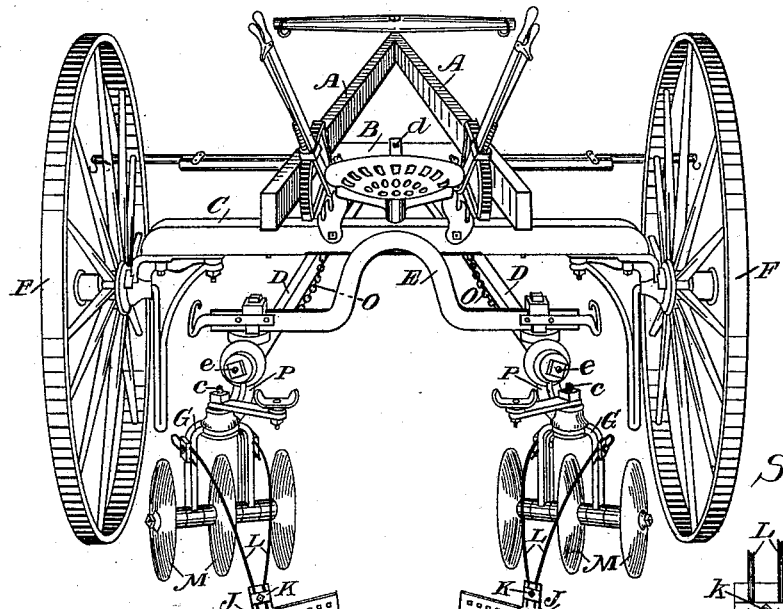
Fig. 1.
Fig. 6.
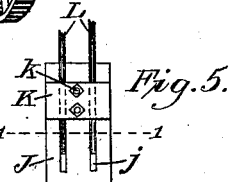
Section 1-1
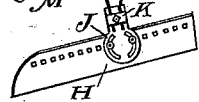
Fig. 5.
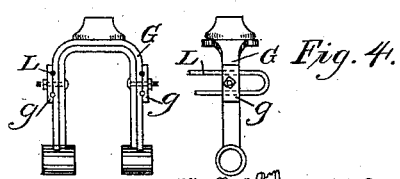
Fig. 3. Fig. 4.
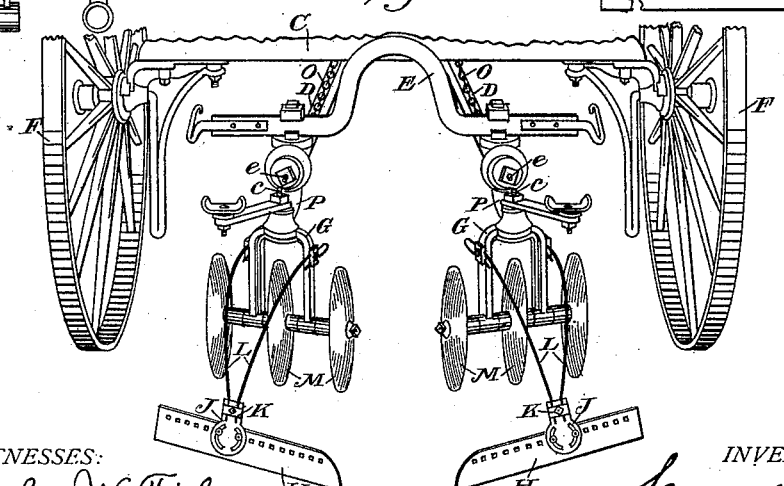
Fig. 2.
WITNESSES:
John W. Fisher
Walter Melius
INVENTOR
Samuel C. Cobb
BY
Robert W. Hardin
ATTORNEY.

UNITED STATES PATENT OFFICE.

SAMUEL C. COBB, OF JANESVILLE, WISCONSIN.

CULTIVATOR.

SPECIFICATION forming part of Letters Patent No. 425,210, dated April 8, 1890.

Application filed January 3, 1890. Serial No. 335,810. (No model.)

*To all whom it may concern:*

Be it known that I, SAMUEL C. COBB, a citizen of the United States, residing at Janesville, in the county of Rock and State of Wisconsin, have invented certain new and useful Improvements in Cultivators, of which the following is a specification.

My invention relates generally to leveling devices adapted to be used on a variety of agricultural implements, and especially on cultivators having gangs of revolving cutters and known as "corn" or "straddle-row" cultivators.

The object of my invention is to make the ground cultivated level and uniform, and also to provide means for trimming a central ridge of earth extending between the cutter gangs and to fill up any depressions or furrows there may be adjacent to said central ridge. I attain these objects by means of the devices illustrated in the accompanying drawings, in which—

Figure 1 represents an end view of a cultivator provided with a leveling device embodying my invention. Fig. 2 represents an end view of a portion of a cultivator similar in general construction to that shown in Fig. 1, but with the gangs closer together and the convex sides of the inner cutters of each gang facing each other. Fig. 3 represents a rear view of a yoke or frame, upon which the cutter gang is mounted. Fig. 4 represents a side view of the same, together with a portion of a standard which supports a leveling-blade. Fig. 5 represents an enlarged view of a portion of a leveling-blade secured to an adjusting-plate. Fig. 6 represents a horizontal cross-section taken on line 1 1 of Fig. 5.

The cultivator illustrated in the drawings is composed of a main and an auxiliary frame. The main frame consists of the axle C, wheels F, and the pole A, in two parts, which meet at their forward ends and are secured at their rear ends to the axle and provided with a cross-bar B, arranged in advance of the axle. The auxiliary frame consists of the bars D, having their forward ends flexibly secured to the cross-bar B, so as to permit vertical and lateral movement of said bars, and having their rear ends connected by means of the yoke E and the cutter gangs mounted upon the yoke or cutter-frame G, connected with the swinging bars D.

The curved standards L, which are made slightly flexible, are secured at their upper ends to the sides of the yokes G, the outer sides of said yokes being provided with grooves corresponding to the shape of the standards. The upper ends of these standards are shown bent so as to make the extreme end parallel with the adjacent part for the purpose of providing a strong fastening end. A clip g, provided with grooves corresponding with the grooves of the yoke, secures the end of the standard in place and permits the longitudinal adjustment of the said end in its bearing. The lower ends of the standards are secured to an adjusting-plate J, provided with vertical grooves j, corresponding in shape with the ends of the standards. A clamping plate or clip K, provided with grooves similar to the grooves j, secures the ends of the standard firmly to the adjusting-plate.

The lower end of the adjusting-plate is provided with curved slots j', arranged opposite to each other, and the leveling-blade H is secured to the adjusting-plate by means of bolts h', passing through the blade and the slots j' and an engaging nut. The curved slots permit the edge of the leveling-blade to be adjusted vertically in a perpendicular plane to correspond to the inclination of the ground traversed.

The upper edge of the leveling-blade is provided with perforations, preferably made square, so that a bolt having a square upper shank may be used, and thereby prevent the bolt and blade from turning. By means of said perforations the scraping-blade may be adjusted on the plate lengthwise of the blade. One of the ends of the scraping-blade is preferably made straight and the other end curved.

I do not desire to be limited to the exact construction of the several parts shown herein. Modifications of the same may be used without departing from my invention.

When constructed as shown, the auxiliary frame is capable of moving vertically and laterally independently of the main frame, and when the gangs are arranged as represented in Fig. 1 the dirt is thrown toward the center of the machine, so as to build up a ridge of earth to cover the roots of corn or other growing crops. When such operation is frequently repeated, however, too much earth is deposited on the ridge, and the straight end of the leveling-blade is therefore set slightly outside the line of the cutters, so as to scrape off any quantity desired from said ridge. The blade being inclined to the line of draft, the surplus dirt is led off and spread out evenly over the adjacent ground.

It is sometimes desired to cut down or trim a heavy ridge or to throw the earth from the center of the machine. In such cases the gangs are brought closer together and arranged with their convex ends inward, as shown in Fig. 2. The gangs when arranged in such position, however, are inclined to cut out too much earth and leave a furrow next to the ridge. The curved end of the blade is therefore turned inward and with a different inclination to the line of draft, as shown in Fig. 2. When in such position, the straight end of the blade gathers additional earth together and, leading it down the inclined line of the blade, deposits it in said furrow, thus making the ground of the desired evenness.

Gangs of disk-cutters, in passing over a field, leave the ground marked with alternate ridges and furrows; but when the gangs are followed by a leveling-blade having the capabilities herein shown the ridges are removed and the furrows filled up. The blade, being supported by flexible standards, is enabled to follow the irregularities of the ground, and may be adjusted at any desired distance from the cutter, so as to permit weeds and trash to pass through between the blades, and by means of the adjusting-plate the blade may be set so as to scrape to any depth desired.

What I claim is—

1. In a cultivator, the combination, with a gang of revolving cutters and a frame for said gang, of a leveling-blade mounted upon a flexible standard, having its upper end adjustable on its seat in the direction of its length, whereby the leveling-blade may be arranged at any desired distance behind the cutters, substantially as shown and described.

2. In a cultivator, the combination, with a gang of revolving cutters and a frame for said gang, of a leveling-blade mounted upon a flexible standard and secured thereto by means of an adjusting-plate, substantially as shown and described.

3. In a cultivator, the combination, with a gang of revolving cutters and a frame for said gang, of a leveling-blade mounted upon a flexible standard and provided with a series of perforations extending in a longitudinal line, an adjusting-plate provided with oppositely-disposed curved slots, and bolts engaging with the perforations of the blade and the slots of the plate, substantially as shown and described.

4. In a cultivator, the combination, with a gang of revolving cutters and a frame for said gang, of a leveling-blade mounted upon a flexible standard and adjustable vertically and laterally on said standard, substantially as shown and described.

5. In a cultivator, the combination, with a gang of revolving cutters and frame G for said gang, of the leveling-blade A, mounted upon the double flexible standards L, and the adjusting-plate K, substantially as shown and described.

In testimony whereof I have hereunto affixed my signature in presence of two witnesses.

SAMUEL C. COBB.

Witnesses:
ROBERT W. HARDIE,
WILLIAM RUGER.